US010305292B2

(12) United States Patent
Madhavi et al.

(10) Patent No.: US 10,305,292 B2
(45) Date of Patent: May 28, 2019

(54) METHODS, APPARATUS, SYSTEMS AND ARTICLES OF MANUFACTURE TO CHARGE A BATTERY BASED ON AN ELECTRONIC DEVICE SKIN TEMPERATURE

(71) Applicant: Intel Corporation, Santa Clara, CA (US)

(72) Inventors: Pralhad Martand Madhavi, Bangalore (IN); Karunakara Kotary, Portland, OR (US); Saurabh Lad, Bangalore (IN); Ravi Kumar Rathore, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 15/283,078

(22) Filed: Sep. 30, 2016

(65) Prior Publication Data

US 2018/0097369 A1    Apr. 5, 2018

(51) Int. Cl.
*H02J 7/00* (2006.01)
*H04M 19/08* (2006.01)
(Continued)

(52) U.S. Cl.
CPC .......... *H02J 7/0004* (2013.01); *H02J 7/0054* (2013.01); *H02J 7/0091* (2013.01); *H02J 7/047* (2013.01);
(Continued)

(58) Field of Classification Search
CPC .............. B60L 11/1861; B60L 11/1875; B60L 2240/545; B60L 11/187; B60L 2240/662; H02J 7/047; H02J 7/0091
(Continued)

(56) References Cited

U.S. PATENT DOCUMENTS

| 8,203,314 | B2 * | 6/2012 | Odaohhara | H02J 7/0091 |
| | | | | 320/128 |
| 2006/0043928 | A1 * | 3/2006 | Nakasho | H02J 7/0045 |
| | | | | 320/112 |

(Continued)

FOREIGN PATENT DOCUMENTS

EP    1148613    10/2001

OTHER PUBLICATIONS

International Searching Authority, "International Search Report," mailed in connection with International Patent Application No. PCT/US2017/049450, on Dec. 11, 2017, 3 pages.
(Continued)

*Primary Examiner* — Nghia M Doan
(74) *Attorney, Agent, or Firm* — Hanley, Flight & Zimmerman, LLC

(57) ABSTRACT

Methods, apparatus, systems, and articles of manufacture for a battery charging device are disclosed. Example battery charging devices include a temperature sensor to sense a skin temperature of an electronic device in which the battery is installed, and a current controller to control a magnitude of a charging current to be supplied to the battery. The current controller causes the magnitude of the charging current to oscillate between an upper level and a lower level and a current adjuster adjusts the upper level downwards and the lower level upwards based on the skin temperature sensed by the temperature sensor. In some examples, a memory device stores a thermal set point and a comparator compares the skin temperature to the thermal set point and transmits a control signal to the current adjuster based on the comparison of the thermal set point to the skin temperature.

24 Claims, 9 Drawing Sheets

(51) Int. Cl.
 *H02J 7/04* (2006.01)
 *H04M 19/00* (2006.01)
(52) U.S. Cl.
 CPC ..... *H04M 19/08* (2013.01); *H02J 2007/0062* (2013.01); *H04M 19/00* (2013.01)
(58) Field of Classification Search
 USPC .................................................. 320/114, 150
 See application file for complete search history.

(56) References Cited

U.S. PATENT DOCUMENTS

| | | |
|---|---|---|
| 2013/0093399 A1 | 4/2013 | Svensson et al. |
| 2013/0193914 A1* | 8/2013 | Gaddann ................. H02J 7/007 320/108 |
| 2015/0066405 A1 | 3/2015 | Li et al. |
| 2015/0229155 A1* | 8/2015 | Sporck ................. H02J 7/0073 320/107 |
| 2016/0266628 A1 | 9/2016 | Jain et al. |

OTHER PUBLICATIONS

International Searching Authority, "Written Opinion," mailed in connection with International Patent Application No. PCT/US2017/049450, on Dec. 11, 2017, 10 pages.

\* cited by examiner

METHODS, APPARATUS, SYSTEMS AND ARTICLES OF MANUFACTURE TO CHARGE A BATTERY BASED ON AN ELECTRONIC DEVICE SKIN TEMPERATURE

FIELD OF THE DISCLOSURE

This disclosure relates generally to battery charging controllers and, more particularly, to methods, apparatus, systems and articles of manufacture to charge a battery based on an electronic skin device temperature.

BACKGROUND

Portable electronic devices are typically powered by rechargeable batteries. Recent advancements in battery charging technologies have increased the speed at which such portable devices can be recharged. However, greater charging speeds typically result in greater heat generation. Current technologies to control the heat generated during charging of a battery involve charging the battery at a current level and then reducing the current level when the battery temperature exceeds a specified temperature. The charging current level is identified in battery specifications and is determined by the battery manufacturer based on testing of the corresponding battery in laboratory conditions. An example battery specification may indicate that a charging rate of 100% (full charging current) is to be applied when the battery is at a temperature between 0° C. and 45° C. and that a charging rate of only 50% (half charging current) is to be applied when the battery temperature is between 45° C. and 60° C.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1A:
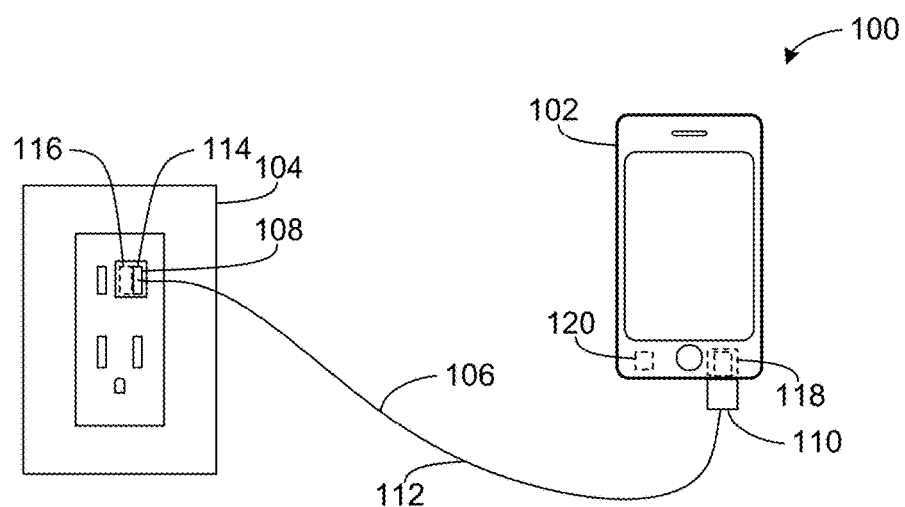
FIG. 1A is a schematic diagram of an example first electronic device coupled to an electrical wall outlet via a charging device.

Recent advancements in battery charging technologies have increased the speed at which electronic devices can be charged/recharged to rates that were unheard of only a few years ago. However, greater charging speeds typically result in greater heat generation which, if left unchecked, can damage the electronic device being charged. Current technologies to control heat generation during battery charging involve charging with a charging current and then reducing (throttling) the charging current when the battery temperature exceeds a specified temperature. The specified temperature is identified in battery specifications (including a thermal relationship table) and is determined by the battery manufacturer based on testing of the corresponding battery in laboratory conditions. An example battery specification may indicate that a charging rate of 100% (full charging current) is to be applied when the battery is at a temperature between 0° C. and 45° C. and that a charging rate of only 50% (half charging current) is to be applied when the battery temperature is between 45° C. and 60° C. Due to differences in device/platform configurations, a battery may generate more heat when charged in one device than when charged in another device. As a result, laboratory testing must often be performed on a per device (or per platform) basis which quickly becomes extensive and, thus, costly.

Moreover, there is evidence indicating that simply reducing the amplitude of the charging current by a set amount, although, effective in reducing the device temperature can also result in unstable thermal performance which, over time, can damage the device being charged. In addition, the amount by which the charging current is to be reduced as specified in battery charging specification is often larger than is actually needed to achieve temperature control, thereby unnecessarily sacrificing battery charging speed. Further, new USB devices (e.g., USB type C connector, USB power delivery, etc.) that are capable of introducing greater amounts of charging current to a rechargeable device are being introduced to the marketplace. In some instances, the new USB devices can operate at any of several different power profiles (e.g., 15 W, 30 W, 60 W, 100 W). However, current methods of throttling the charging current to control current heat generation treat are not adapted to devices operating at different power profiles. As a result, the amount of current reduction occurring at each power level is the same without regard to the characteristics of the power profile being used. Using a one-size-fits-all approach to controlling heat generation typically results in reducing the charging current by an overly conservative amount thereby unnecessarily reducing charging speed.

Methods, apparatus, systems, and articles of manufacture disclosed herein control an amount of heat generated by charging a battery installed in an electronic device based on the skin temperature of the electronic device. An example disclosed battery charging controller includes a charging current controller that causes a charging current to oscillate between an upper charging current level and a lower charging current level. The disclosed battery charging controller also includes a current adjuster that adjusts the upper and lower charging current levels based on the skin temperature. The upper and lower charging current level are positioned above and below a first target charging current level 340. In some examples, the first target charging current level 340 changes to a second target charging current level 350 in response to changes in the skin temperature and the skin temperature changes in response to an amount of load placed on the electronic device. Thus, as the skin temperature increases in response to an increased load, the target charging current level decreases. As the skin temperature decreases in response to a load decrease, the target charging current level increases. Thus, the battery charging controller disclosed herein tunes the first target charging current level 340 based on the changing skin temperature, and, as a result, the changing load. As a result, the battery charger controller disclosed herein is adapted to permit battery charging to be tightly tied to the actual load placed on a system being charged. This permits increased battery charging speed while maintaining desired thermal performance (e.g., thermal stability). In addition, the battery charging controller disclosed herein is adapted to use a power profile at which a device is being charged to control the upper and lower charging current levels. In some such examples, the upper charging current level represents a highest charging current and the lower charging current level represents a lowest charging current. Thus, the disclosed battery charging controller can control the charging current for electronic devices that charge at different power profiles/levels, thereby eliminating the need to create thermal relationship tables for each individual power profile.

FIG. 1A is a schematic diagram of a first electronic device charging scenario 100 in which an example first electronic device 102 is coupled to an electrical wall outlet 104 via an example charging device 106. The first electronic device 102 can be implemented as any electronic device powered by a rechargeable battery (e.g., a mobile telephone, a laptop computer, a tablet, a hybrid laptop/tablet device, a handheld video game, etc.). In some examples, the charging device 106 includes an example first connector 108 and an example second connector 110 coupled via an example electrical cord 112 and further includes an example wall wart 114 having a set of prongs that are adapted to plug into the electrical outlet 104. The first connector 108 is inserted into an example first port 116 disposed in the wall wart 114 and the second connector 110 is inserted into an example second port 118 disposed in the first electronic device 102. Thus, the battery charging device 106 supplies power/current from the electrical wall outlet 104 to the first electronic device 102. An example battery charging controller 120 installed in the first electronic device 102 controls the amount of power/current delivered to the first electronic device 102 via the charging device 106.

Figure 1B:
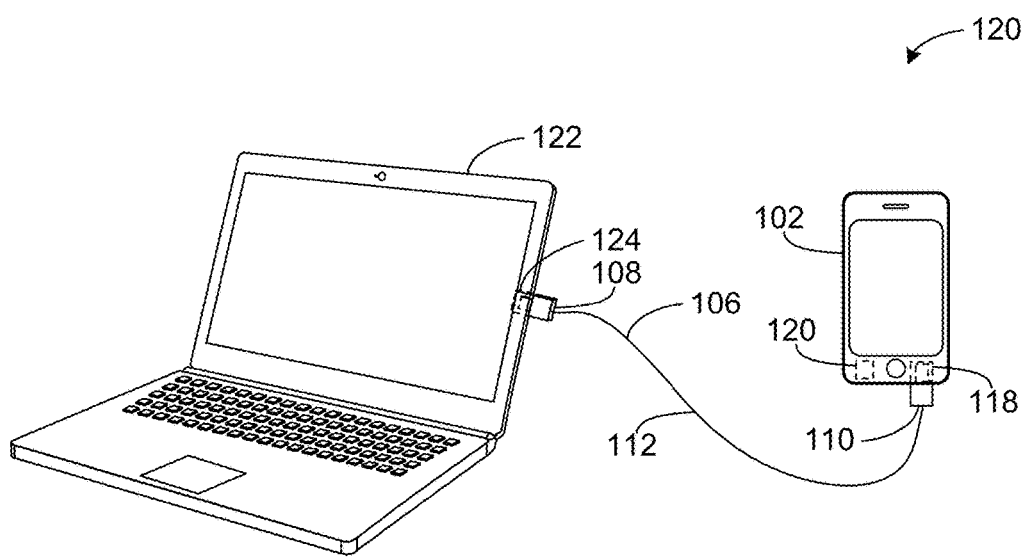
FIG. 1B is a schematic diagram of the example first electronic device coupled to an example second electronic device via a charging device.

FIG. 1B is a schematic diagram of a second electronic device charging scenario 121 in which the example first electronic device 102 (also shown in FIG. 1A) is coupled to an example second electronic device 122 via the example charging device 106 (also shown in FIG. 1A). The second electronic device 122 can be implemented using any electronic device powered by a rechargeable battery (e.g., a mobile telephone, a laptop computer, a tablet, a hybrid laptop/tablet device, a handheld video game, etc.) and/or powered via an electrical wall outlet. In some examples, the second electronic device 122 includes an example third port 124 that is adapted to receive the first connector 108 of the battery charging device 106 and the first connector 108 is coupled to the example second connector 110 via the example electrical power cord 112. The example second connector 110 is inserted into the second port 118 of the first electronic device 102. The example battery charging controller 120 installed in the first electronic device 102 controls the amount of power/current (also referred to as the incoming charging current) permitted to enter the first electronic device 102 from the second electronic device 122 via the battery charging device 106.

Figure 2:
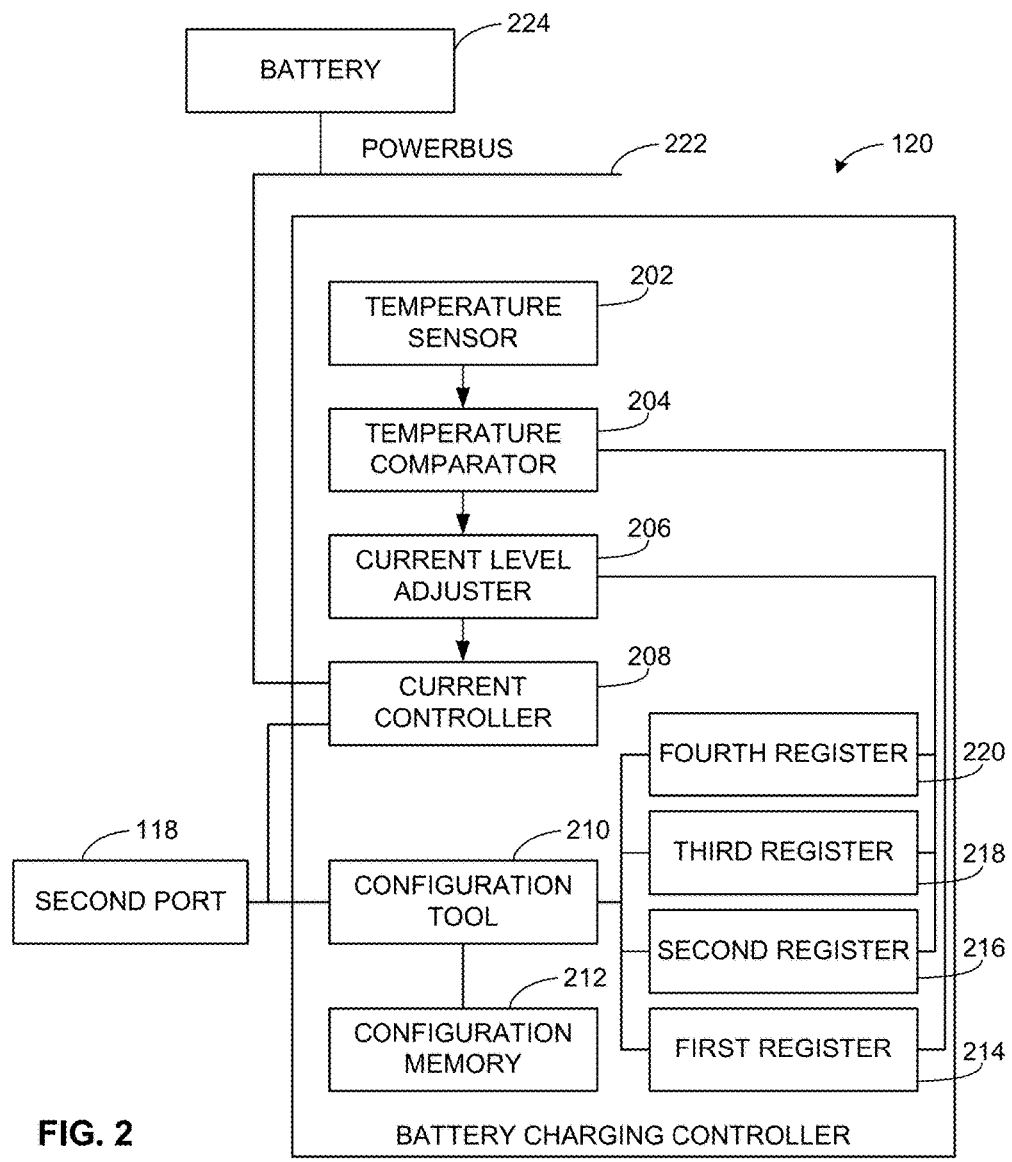
FIG. 2 is a block diagram of an example battery charging controller 120 installed in either (or both) of the example first and second electronic devices of FIG. 1A and FIG. 1B.

FIG. 2 is a block diagram of the example battery charging controller 120 installed in the example first electronic device 102 of FIG. 1A, and FIG. 1B. The battery charging controller 120 includes an example temperature sensor 202, an example temperature comparator 204, an example current level adjuster 206, an example current controller 208, an example configuration tool 210, an example configuration memory 212, an example first register 214, an example second register 216, an example third register 218, an example fourth register 220. In some examples, the battery charging controller 120 is coupled to an example power bus 222 which supplies power to an example battery 224. In some examples, the battery charging controller is coupled directly to the example battery 224. In some examples, the temperature sensor 202 is disposed adjacent to (and touching) an exterior housing (also referred to as a skin) of the first electronic device 102. In some examples, when a battery charging device (such as the example battery charging device 106 of FIG. 1A and FIG. 1B) is coupled to the first electronic device 102, the battery charging device 106 supplies information identifying a charging profile for the battery charging device 106 to the battery charging controller 120. In some examples, the battery charging controller 120 receives the charging profile from the battery charging device 106 at the configuration tool 210. In some examples, the configuration tool 210 accesses the configuration memory 202 in which a set of parameters corresponding to the identified charging profile are stored. In some examples, the first such parameter is a temperature (also referred to as a "thermal set point") corresponding to the skin temperature at which the charging current would be throttled/reduced if conventional battery charger control methodologies were being used.

In some such examples, the configuration tool 210 identifies the thermal set point in the configuration memory 212 and stores the thermal set point in the first register 214. In some examples, the configuration tool 210 also accesses the configuration memory 212 to determine the control values/parameters corresponding to the charging profile such as 1) a charging current step value, 2) a lower charging current level, and 3) an upper charging current level. The configuration tool causes the charging current step value, the lower charging current level, and the upper charging current level to be stored in second register 216, the third register 218, and the fourth register 220, respectively, for use in controlling the current supplied by the battery charging device 106 to the second port 118 of the electronic device 102.

In some examples, the example temperature comparator 204 of the example charging controller 120 receives skin temperature readings collected by the example temperature sensor 202 and compares the readings to the thermal set point stored in the first register 214. Provided that the skin temperature remains below the thermal set point, the battery charging controller 120 does nothing to control the charging current being supplied to the first electronic device 102. As a result, a current supplied by the battery charging device 106 to the second port 118 of the electronic device 102 is equal to an incoming charging current supplied via the output of the current controller 208 to the power bus 222 of the electronic device 102.

When the skin temperature exceeds the thermal set point a first time, the thermal comparator 204 provides an alert signal to the current adjuster 206. The current level adjustor 206 responds to the alert signal by adding the step current value stored in the second register 216 to the lower charging current level stored in the third register 218 and supplying the sum to the example current controller 208. The current controller 208 then begins controlling the amount of incoming charging current that will be provided to the power bus 222 of the electronic device 102 to a value equal to the sum supplied by the current level adjustor 206. In addition to supplying the sum to the current controller, the current level adjustor 206 places the sum in the second register 216 thereby setting the lower charging current level equal to the sum. Thus, the current level adjustor 206 raises the lower charging current level by an amount equal to the charging current step value.

After the example current controller 208 reduces the incoming charging current to the lower charging current level stored in the second register 216, (and provided that the system load on the electronic device 102 has not changed) the skin temperature is expected to decrease in response to the decreased incoming current. Thus, the example temperature sensor 202 collects another skin temperature reading and supplies the skin temperature reading to the example temperature comparator 204 which compares the skin temperature reading to the thermal set point. If the temperature comparator 204 determines that the skin temperature has decreased below the thermal set point, the current level adjustor 206 subtracts the charging current step value stored in the second register 216 from the magnitude of the upper charging current level stored in the fourth register 220 and stores the outcome in the fourth register 220. In addition, the current level adjustor 206 supplies the outcome to the current controller 208 which increases the amount of incoming current supplied to the power bus 222 of the electronic device 102 to an amount equaling the outcome. Again, provided that the system load has not changed, the increase in the amount of incoming current is expected to cause the skin temperature to rise to a level that exceeds the thermal set point. Thus, after the current controller begins controlling the incoming charging current to a value equal to the adjusted upper charging current level stored in the fourth register 220, the temperature comparator 204 collects another skin temperature reading from the temperature sensor 202 and compares the collected skin temperature reading to the thermal set point.

If the collected skin temperature reading does exceed the thermal set point (as is expected in light of the increase in incoming charging current), then the current level adjustor 206 again determines the sum of the lower charging current level stored in the third register 218 and the charging current step value and causes the sum to be stored in the third register 218 as the lower charging current level. In addition, the current level adjustor 206 supplies the adjusted lower charging current level to the current controller 208 which decreases the incoming charging current to a level equal to the adjusted lower charging current level.

The current level adjustor 206 then compares the thermal set point to a most-recently collected skin temperature reading to determine whether the collected skin temperature reading falls below the thermal set point. In this instance, the collected skin temperature reading is expected to fall below the thermal set point in light of the decrease in incoming battery charging current. Provided that the collected temperature reading falls below the thermal set point, then the current level adjustor 206 again adds the upper charging current level stored in the fourth register 220 to the current step value (in the second register 216) and replaces the value stored in the fourth register 220 with the newly calculated sum. In addition, the newly calculated sum is supplied by the current level adjustor 206 to the current controller 208 which responds by increasing the incoming charging current to an amount equaling the newly calculated sum. The temperature comparator 204, current level adjustor 206, and the current controller 208 continue to operate in this manner, provided that the skin temperature continues to behave as expected, until the upper and lower charging current levels stored in the third register 218 and the fourth register 220, respectively, are equal thereby indicating that the incoming charging current has reached a target (e.g., optimal) charging level.

As a result, the battery charging controller 120 continues to control the incoming battery charging current at the target charging level until either the battery charging device 106 is unplugged from the first electronic device 102 or the system load changes. In some examples, while maintaining the incoming charging current at the first target charging current level 340, the temperature comparator 204 continues to monitor the skin temperature. Provided that the skin temperature remains within a desired threshold of the thermal set point, the current controller 208 continues to supply (to the power bus 222) an incoming charging current equal to (or within one charging current step value above/below) the first target charging current level 340.

In some examples, if the load on the system decreases, the example battery charging controller 120 operates to retune the incoming battery charging current to oscillate around a second target charging current level 350 (instead of the first target charging current level 340). The retuning occurs when the skin temperature does not behave as expected (e.g., the skin temperature does not exceed the thermal set point 330 after the current controller 208 has changed the incoming charging current from the lower charging current level to the upper charging current level). To effect the retuning, the current level adjustor 206 increases the upper charging current level until the skin temperature exceeds the thermal set point 330. Thereafter, the battery charging controller 120 causes the incoming charging current to oscillate. However, the oscillations now occur about the second target charging current level 350 due to the changes made to the upper charging current level.

In some examples, if the load on the system increases, the example battery charging controller 120 operates to retune the incoming battery charging current to oscillate around a third target charging current level 360. The system load increase is detected by the battery charging controller 120 when a most recently collected skin temperature reading fails to fall below the thermal set point 330 after the incoming charging current has been decreased from the upper charging current level to the lower charging current level. To effect the retuning, the current level adjustor 206 decreases the lower charging current level until the skin temperature falls below the thermal set point 330. Thereafter, the battery charging controller 120 causes the incoming charging current to oscillate. However, the oscillations now occur about the third target charging current level 360 due to the changes made to the lower charging current level.

The example battery charging controller 120 continues to cause the incoming charging current to oscillate about the target charging current level until either 1) the battery charging device 106 is unplugged from the first electronic device 102, 2) the load on the first electronic device 102 changes, or 3) the upper and lower charging current values stored in the third and fourth registers, 218, 220 become equal to each other or are separated by an amount less than or equal to the step current value in the second register 216.

Figure 3:
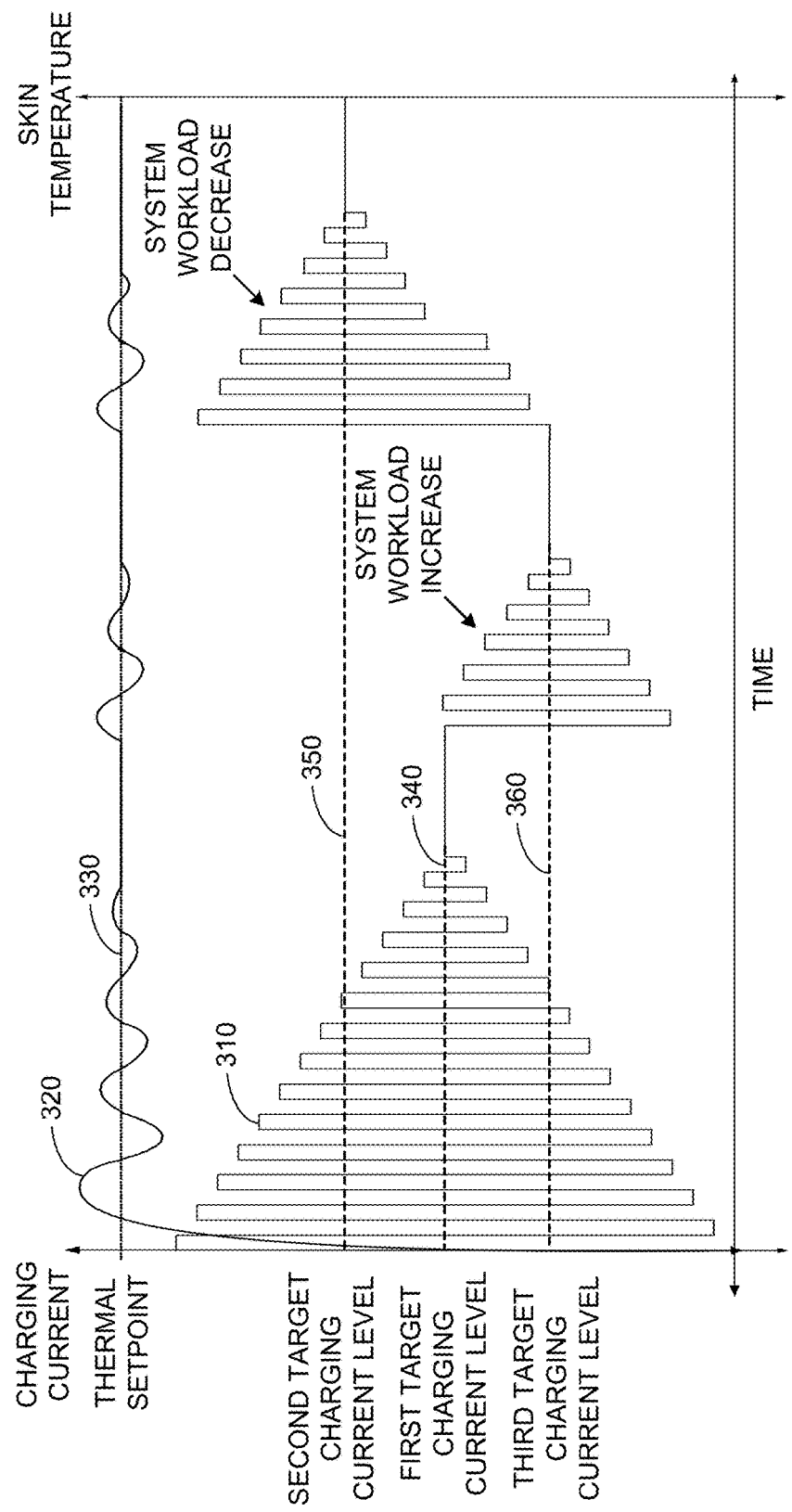
FIG. 3 includes two graphs illustrating a relationship between the magnitude of a battery charging current over time and the relationship of an electronic device skin temperature over time. Both relationships reflect the operation of an electronic device being charged with the battery charging controller 120 of FIG. 2.

FIG. 3 provides a graph illustrating a first waveform 310 representing the incoming charging current as controlled by the example battery charging controller 120 over time and also illustrating a second wave form 320 representing the skin temperature of the first electronic device 102 over time. The time at which the graph begins is the time at which the battery controlling device 120 begins actively controlling the incoming charging current. Referring now to FIGS. 2 and 3, in operation, the battery charging controller 120 monitors the skin temperature of the first electronic device 102 and compares the readings to the thermal set point 330. Provided that the skin temperature remains below the thermal set point 330, the battery charging controller 120 does nothing to control (or change) the charging current being supplied to the first electronic device 102. When the skin temperature exceeds the thermal set point 330 a first time, the battery charging controller 120 begins controlling the incoming charging current in a manner that allows the first electronic device 102 to achieve thermal stability while attempting to minimize any resulting impact on the charging speed. In some examples, the battery charging controller 120 is configured to cause the incoming charging current to oscillate above and below a first target (e.g., optimal) charging current level 340 that corresponds to the thermal set point 330 of the first electronic device 102. In some examples, the target charging current level is selected so that, when the incoming charging current is controlled to a value at (or near) the first target charging level 340, the skin temperature of the first electronic device 102 remains just below or at the thermal set point 330. In some examples, the first target charging current level 340 is between an upper charging current value and a lower charging current value. Provided that the skin temperature behaves in an expected manner (i.e., an increase in incoming charging current causes the skin temperature to rise above the thermal set point 330 and a decrease in incoming charging current causes the skin temperature to fall below the thermal set point 330), the battery charging controller 120 causes the incoming charging current to oscillate about the first target charging current level 340 in increasingly smaller oscillations until the lower and upper charging currents are equal to (or within a threshold distance of) the same value (e.g., the target charging current level). When the incoming charging current is at or very near the first target charging current level 340, the battery charging controller 120 causes the incoming charging current to remain at (or very near) that value until either the charger is unplugged, or until a load placed on the first electronic device changes.

If the load placed on the example first electronic device 102 changes while the first electronic device 102 is charging, then the skin temperature will not behave in the expected manner. In some such examples, if the load decreases by a sufficient amount, then increasing the incoming charging current will not cause the skin temperature to rise above the thermal set point 330. Likewise if the load increases by a sufficient amount, then decreasing the incoming charging current will not cause the skin temperature to fall below the thermal set point 330. In some such examples, when the system load has decreased, the battery charging controller 120 will retune the system to determine a higher target charging current (e.g., a second target charging current) 350 and then cause the incoming charging current to oscillate about the second target charging current level 350. In some such examples, when the system load has increased, the battery charging controller 120 will retune the system to determine a lower, target charging current level (e.g., a third target charging current level 360) and then cause the incoming charging current to oscillate about the third target charging current level 360.

Thus, in the absence of system load changes, the example battery charging controller 120 operates to cause the incoming charging current to oscillate about a first target charging current level 340 in increasingly smaller oscillations until the first target charging current level 340 is reached. When the first target charging current level 340 is reached, the battery charging controller 120 allows the incoming charging current to stabilize at the first target charging current level 340 (e.g., the oscillations stop or are negligibly small). When operating at the first target charging current level 340, the skin temperature of the first electronic device remains just below the temperature set point such that the thermal response of the first electronic device stabilizes. The battery charging controller 120 maintains such a level incoming current until the battery charging device 106 is unplugged. If the system load increases or decreases, the battery charging controller 120 decreases or increases, respectively, the target charging current level thereby retuning the incoming charging current to oscillate around a second target charging current level 350 (or a third target charging current level 360, or a fourth target charging current level, and so on) until the system load changes again or until the revised target charging current level is reached. The battery charging controller 120 continues in the above described manner until the battery charging device 106 is unplugged.

Figure 4A:
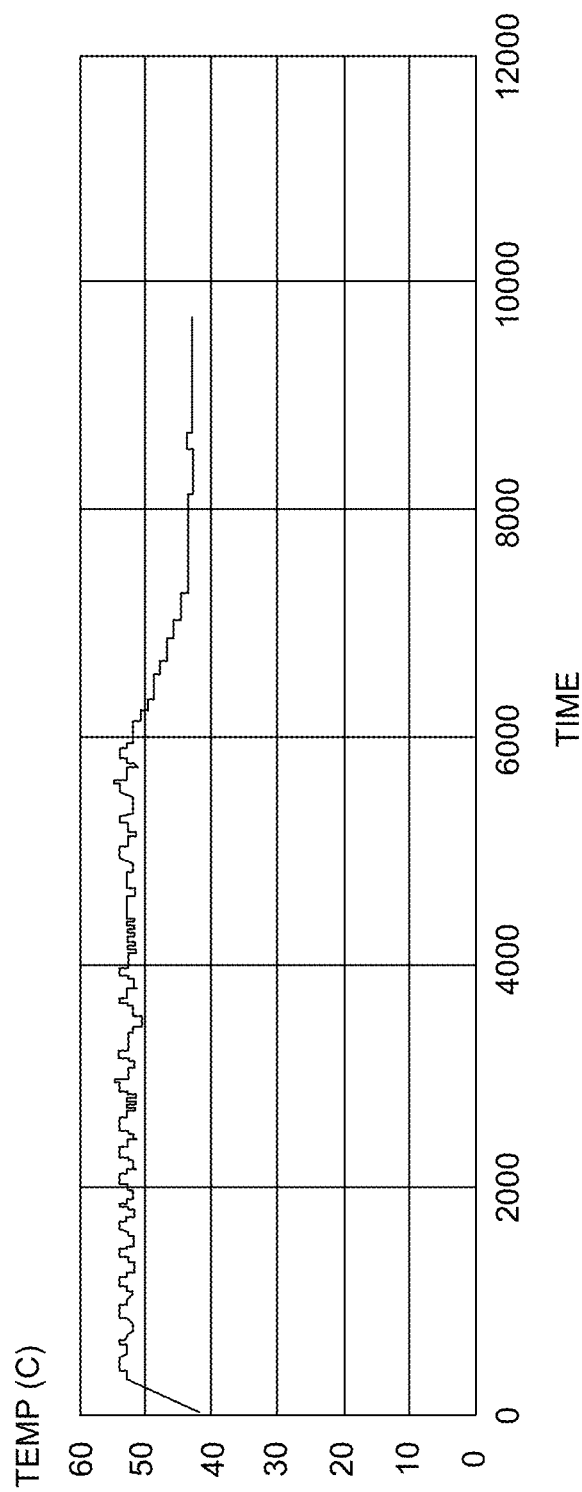
FIG. 4A is a graph illustrating the thermal response of an electronic device being charged with battery charging controller 120 that uses a conventional battery charging control method.
Figure 4B:
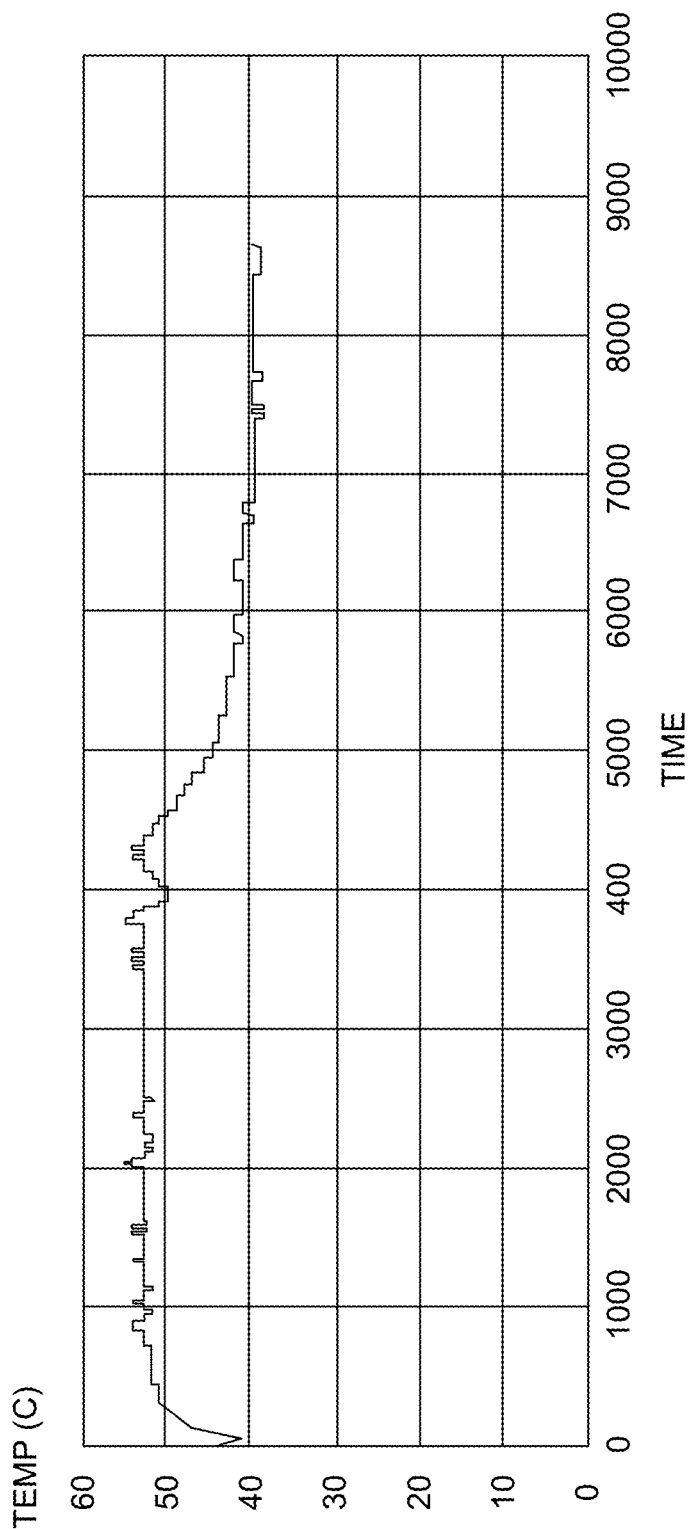
FIG. 4B is a graph illustrating the thermal response of an electronic device being charged with the battery charging controller 120 of FIG. 2 using the battery charging control methods disclosed herein.

FIG. 4A illustrates the skin temperature of the example electronic device 102 being charged using conventional battery charging techniques in which an incoming charging current at a capacity of 100% is used until a skin temperature exceeds a thermal set point 330 of the device. After the thermal set point 330 is exceeded, the incoming charging current is incrementally reduced by a preset amount until the skin temperature falls below the thermal set point 330. Thereafter a full incoming charging current is again used until the skin temperature reaches the thermal set point 330 at which time the incoming charging current is again reduced. The incoming charging current is controlled in this manner until the example battery charging device 106 is unplugged from the first electronic device 102. As illustrated in FIG. 4A, this conventional technique causes the electronic device being charged to be thermally unstable. In contrast, FIG. 4B shows the skin temperature of the first electronic device 102 being charged using the techniques disclosed herein. The battery charging techniques disclosed herein cause an incoming charging current to oscillate around a target charging current level in smaller and smaller oscillations. Allowing the incoming charging current level to slowly settle to the target charging current level in this manner (e.g., by slowly decreasing the magnitude of the current oscillations), provides enhanced thermal performance, as illustrated in FIG. 4B.

Figure 4C:
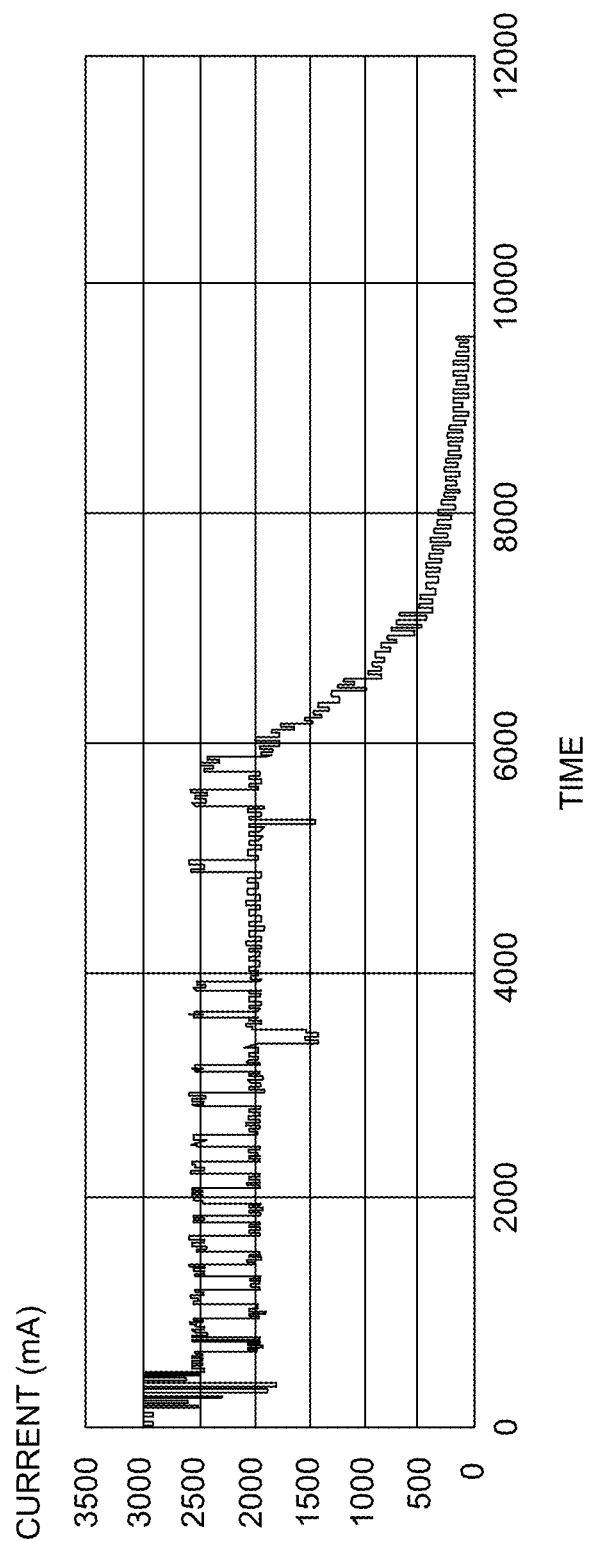
FIG. 4C is a graph illustrating computer processing unit throttling experienced by an electronic device being charged with a battery charging controller 120 that uses a conventional battery charging control method.
Figure 4D:
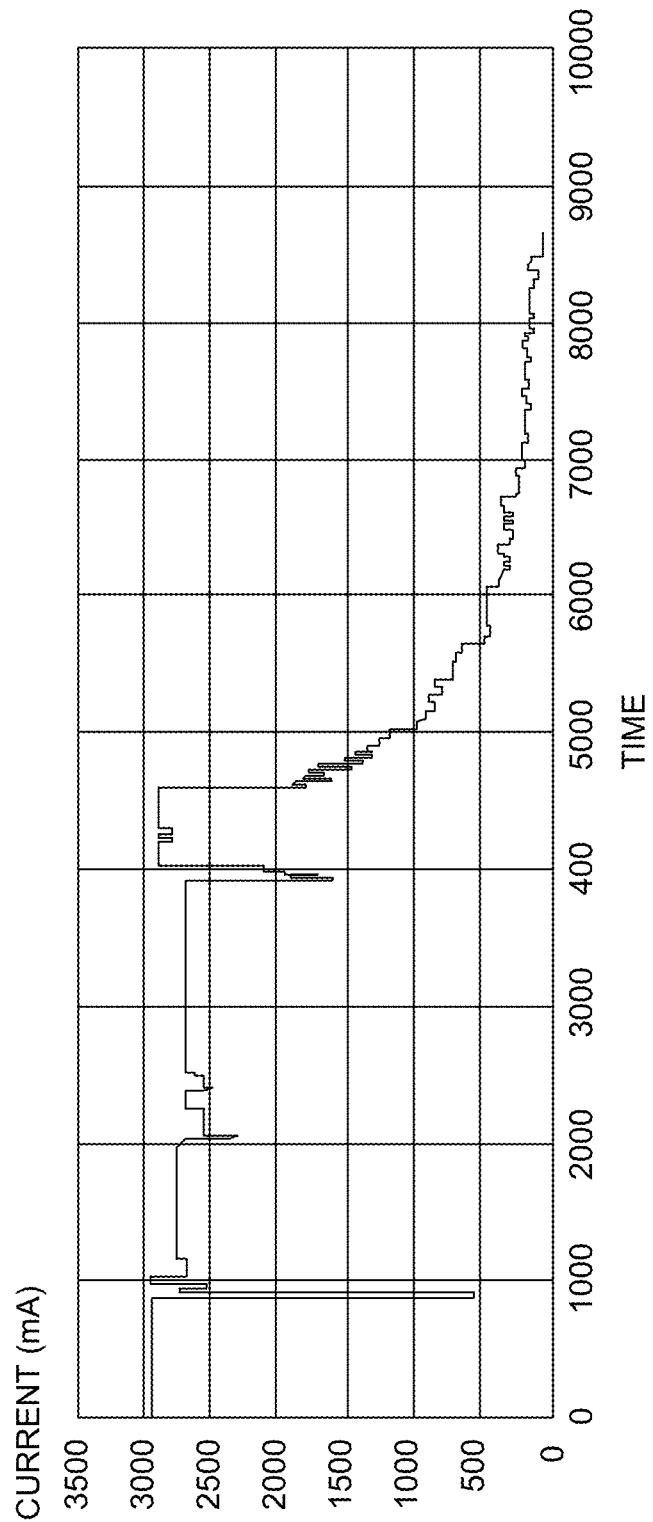
FIG. 4D is a graph illustrating computer processing unit throttling experienced by an electronic device being charged with the battery charging controller 120 of FIG. 2 using the battery charging control methods disclosed herein.

FIG. 4C is a graph showing a charging current rate over time of the example electronic device 102 being charged using conventional charging control technique. FIG. 4D is a graph showing a charging current rate over time of the example electronic device 102 being charged using the battery charging control techniques disclosed herein. A comparison of FIG. 4C to FIG. 4D reveals that conventional battery charging control technique causes the first electronic device 102 being charged to experience more computer processing unit (CPU) throttling than the same device experiences when being charged with the improved battery charging control technique disclosed herein. Thus, the battery charging control methods/techniques disclosed herein result in more stable thermal performance, less CPU throttling and faster charging speeds than are achieved using conventional battery charging techniques.

While an example manner of implementing the battery charging controller 120 is illustrated in FIG. 2, one or more of the elements, processes and/or devices illustrated in FIG. 2 may be combined, divided, re-arranged, omitted, eliminated and/or implemented in any other way. Further, the example temperature sensor 202, the example temperature comparator 204, the example current level adjuster 206, the example current controller 208, the example configuration tool 210, the example configuration memory 212, the example first register 214, the example second register 216, the example third register 218, the example fourth register 220, and/or, more generally, the example battery charging controller 120 may be implemented by hardware, software, firmware and/or any combination of hardware, software and/or firmware. Thus, for example, any of the example temperature sensor 202, the example temperature comparator 204, the example current level adjuster 206, the example current controller 208, the example configuration tool 210, the example configuration memory 212, the example first register 214, the example second register 216, the example third register 218, and the example fourth register 220 and/or, more generally, the example battery charging controller 120 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example temperature sensor 202, the example temperature comparator 204, the example current level adjuster 206, the example current controller 208, the example configuration tool 210, the example configuration memory 212, the example first register 214, the example second register 216, the example third register 218, and the example fourth register 220 is/are hereby expressly defined to include a tangible computer readable storage device or storage disk such as a memory, a digital versatile disk (DVD), a compact disk (CD), a Blu-ray disk, etc. storing the software and/or firmware. Further still, the example battery charging controller 120 of FIG. 2 may include one or more elements, processes and/or devices in addition to, or instead of, those illustrated in FIG. 2 and/or may include more than one of any or all of the illustrated elements, processes and devices.

Figure 5:
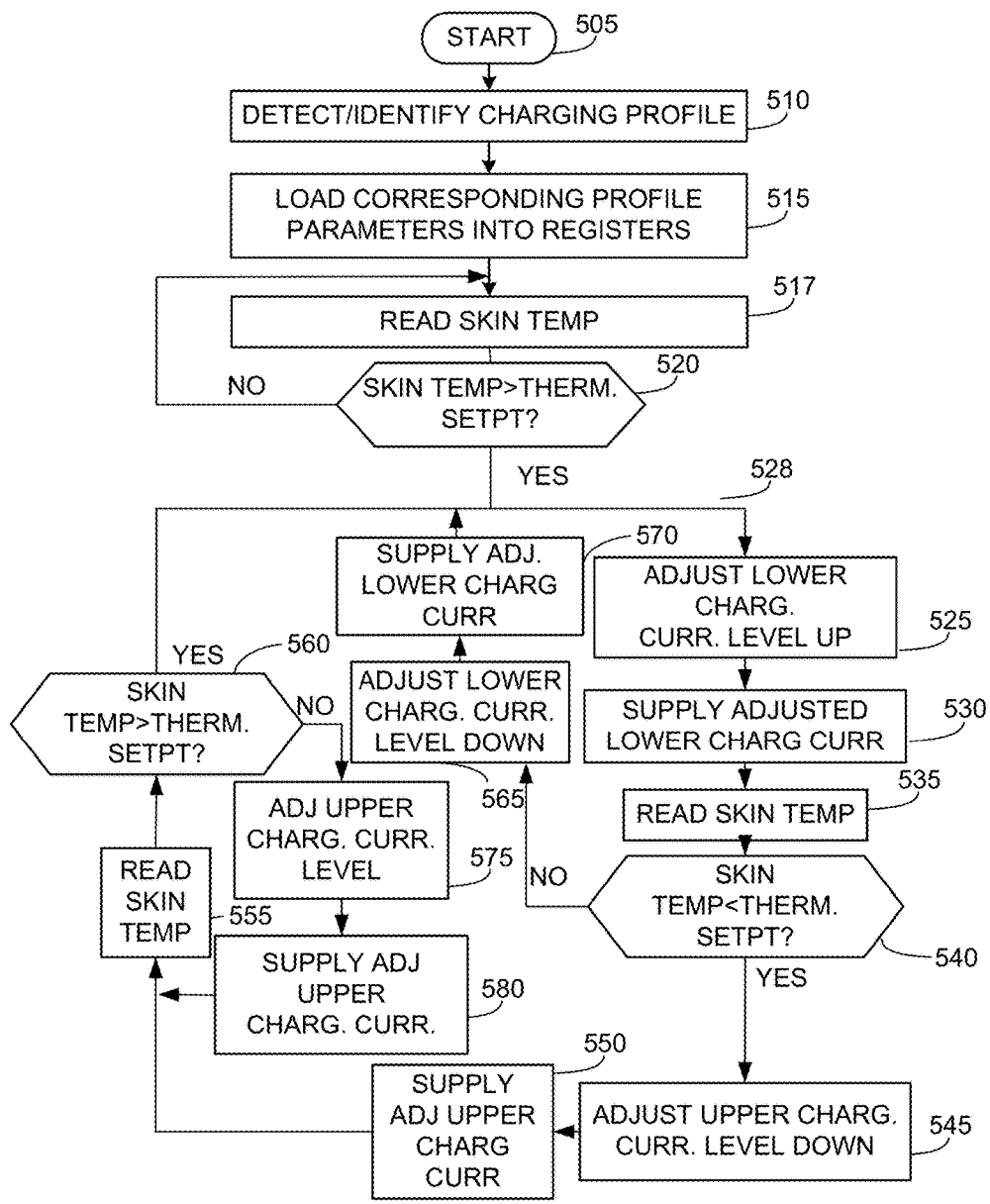
FIG. 5 is an example flow chart representative of example machine readable instructions which may be executed to implement the example battery charging controller 120 of FIG. 2.

Flowcharts representative of example machine readable instructions for implementing the example battery charging controller 120 of FIG. 2 are shown in FIG. 5. In these examples, the machine readable instructions comprise a program(s) for execution by a processor such as the processor 612 shown in the example processor platform 600 discussed below in connection with FIG. 6. The program(s) may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIG. 5, many other methods of implementing the example battery charging controller 120 of FIG. 2 may alternatively be used. For example, the order of execution of the blocks may be changed, and/or some of the blocks described may be changed, eliminated, or combined.

As mentioned above, the example processes of FIG. 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably.

Additionally or alternatively, the example processes of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

The program 500 of FIG. 5 provides example operations performed by the example battery charging controller 120 of FIG. 2 and begins at block 505 at which a charging device is plugged into the first electronic device. At a block 510, the example configuration tool 210 (see FIG. 2) receives information from the battery charging device 106 (see FIG. 1A, 1B) indicating a charging profile at which the battery charging device 106 is operating. In addition, the configuration tool 210 uses the charging profile to obtain a set of parameters corresponding to the charging profile from the example configuration memory 212 (see FIG. 2) (block 515). In some examples, the configuration tool 210 receives the information from a battery driver or a power management integrated circuit installed in the first electronic device 102. In some examples, the manufacturer of the first electronic device 102 can store the configuration information as an option in the basic input/output system (BIOS). As described with respect to FIG. 2, in some examples, the parameters can include a thermal set point 330, a charging current step value, a lower charging current level, and an upper charging current level, all corresponding to the charging profile detected by the configuration tool 210. The example temperature sensor 202 (see FIG. 2) reads/detects the skin temperature of the first electronic device 102 (block 517) and the example temperature comparator 204 compares the skin temperature reading to the thermal set point 330 stored in the first register 214 (block 520). If the comparison indicates that the skin temperature is lower than the thermal set point 330, the temperature sensor 202 again reads the skin temperature (block 517) and the temperature comparator 204 again compares the skin temperature to the thermal set point 330 (block 520). The temperature comparator 204 continues to compare the skin temperature readings taken by the temperature sensor 202 in this fashion until the skin temperature exceeds the thermal set point 330.

When the skin temperature exceeds the thermal set point 330 (determined at the block 520), the example battery charging controller 120 begins actively controlling the battery charging current. In some examples, the example current level adjustor 206 (see FIG. 2) adjusts the lower charging current level in an upwards direction (block 525). In some examples, this is performed by adding the charging current step value stored in the example second register 216 to the lower current charging level stored in the third register 218 thereby raising the lower current charging level. The example current controller 208 (see FIG. 2) then revises the charging current being supplied to the example first electronic device 102 via the power bus 222 to an amount equal to the newly adjusted, lower current charging level stored in the third register 218 (block 530). In addition, the temperature sensor takes a skin temperature reading (block 535) and the temperature comparator 204 compares the most-recently collected skin temperature (taken after the incoming charging current was set equal to the newly adjusted lower charging current level) to the thermal set point 330 (block 540). Provided that the skin temperature is lower than the thermal set point 330 (which is expected because the incoming charging current was reduced to the lower charging current level), the current level adjustor 206 subtracts the charging current step value stored in the second register 216 from the upper charging current level (block 545) and supplies the newly reduced, upper charging level to the current controller 208 for use in controlling the incoming charging current (block 550).

In addition, the example temperature sensor takes another skin temperature reading (block 555) and the temperature comparator 204 compares the newly collected skin temperature (taken after the battery charging current was set equal to the newly decreased, upper charging current level) to the thermal set point 330 (block 560). Provided that the skin temperature is greater than the thermal set point 330 (which is expected because the incoming charging current was increased from the lower charging current level to the upper charging current level at the block 535), the example current level adjustor 206 again adjusts the lower charging current level stored in the third register (see block 525), and supplies the revised lower charging current level to the current controller 208 for use in controlling the current supplied to the power bus 222 (see block 530). In this manner, the battery charging controller 120 causes the incoming charging current to oscillate between the upper and lower charging current levels while decreasing the difference between the upper and lower charging current levels at each oscillation. The battery charging controller 120 continues to oscillate the incoming charging current in the disclosed manner until a skin temperature reading does not behave in an expected manner. As described above, in response to changing the incoming charging current from the lower level to the upper level, the skin temperature is expected to exceed the thermal set point 330. Similarly, in response to the changing the battery charging current from the upper level to the lower level, the skin temperature is expected to fall below the thermal set point 330.

When the skin temperature does not behave in the expected manner at the block 540 (i.e., the skin temperature does not fall below the thermal set point 330 after the battery charging current has been decreased from the upper charging level (see block 535) down to the lower charging level (see block 525)), the example current level adjustor 206 begins tuning the lower charging current level by repeatedly subtracting the charging current step value from the lower charging current level (block 565) and causing the example current controller 208 to reduce the incoming charging current to the new, lower charging current level (block 570). The reduction in the lower charging current level is repeated in this manner until the skin temperature reading falls below the thermal set point 330 as determined by the temperature comparator (see block 530). In some examples, the need to retune the system to a new, lower target charging current level occurs when the system load experienced by the example first electronic device 102 increases. The system load increase raises the temperature of the first electronic device 102 which, in turn, requires that the lower charging current level to be reduced.

Likewise, when the skin temperature does not behave in the expected manner at the block 560 (i.e., the skin temperature does not rise above the thermal set point 330 after the battery charging current has been increased from the lower charging level (see block 525) to the upper charging level (see block 545)), the current level adjustor 206 begins tuning the upper charging current level by adding the charging current step value to the upper charging current level (block 575) and causing the example current controller 208 to increase the incoming charging current to the newly increased, upper charging current level (block 580). The upper charging current level is repeatedly increased in this manner until the skin temperature reading rises above the thermal set point 330 as determined by the example temperature comparator 204 (see block 560). In some examples, the need to retune the system to a new upper charging current level occurs when the system load experienced by the example first electronic device 102 decreases. The system load decrease lowers the skin temperature of the first electronic device 102 which, in turn, permits the upper charging current level to be raised.

The battery charging controller 120 continues to oscillate the charging current in the manner disclosed (see blocks 525, 530, 545, 550) and tune the upper and lower charging current levels based on load changes (see blocks 565, 570 and 575, 580) until the battery charging device 106 is unplugged from the first electronic device 102 (block 555) at which time, the program 500 ends.

Figure 6:
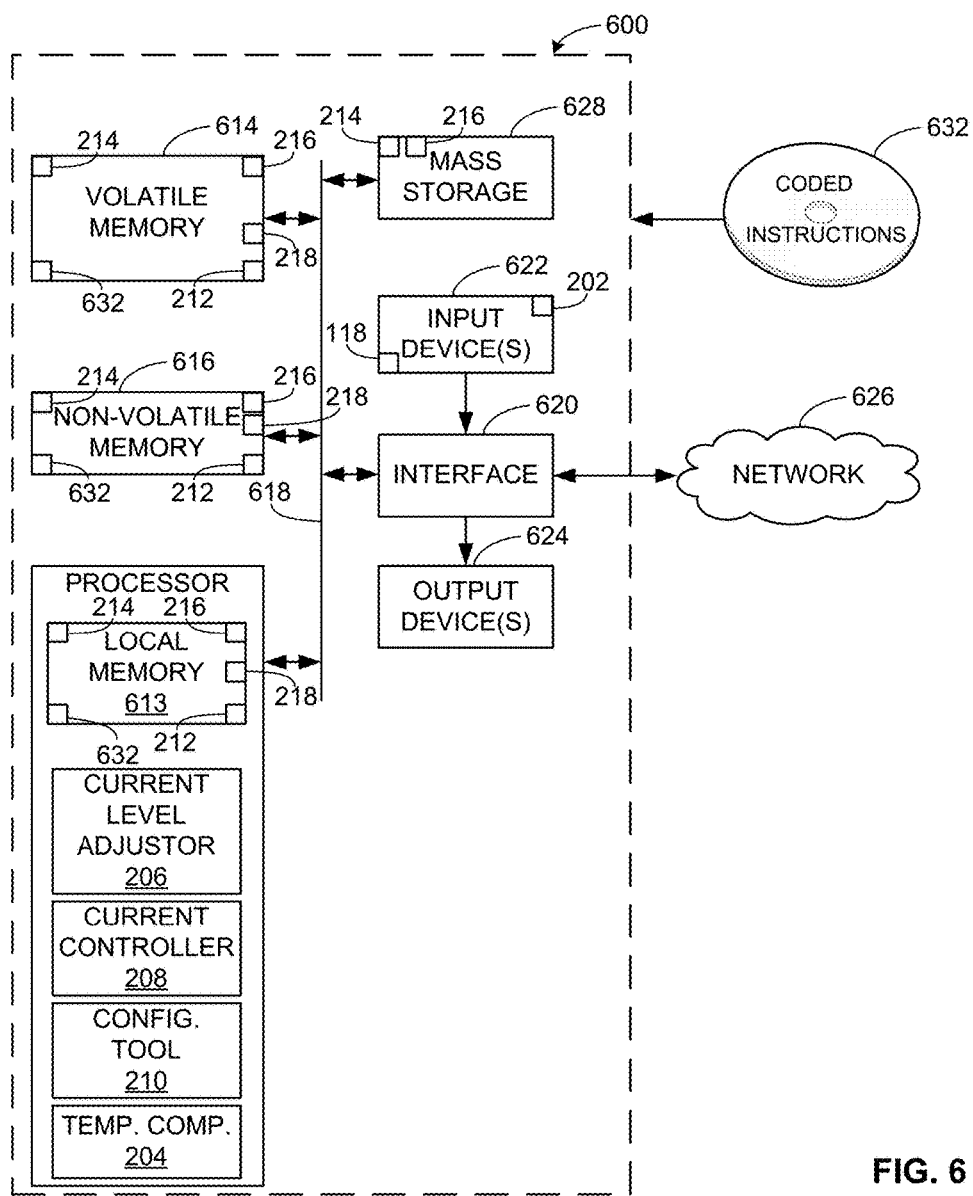
FIG. 6 is a block diagram of an example processor platform capable of executing the instructions of FIG. 5 and implementing the example battery charging controller 120 of FIG. 2.

FIG. 6 is a block diagram of an example processor platform 600 capable of executing the instructions of FIG. 5 to implement the battery charging controller 120 of FIG. 2. The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. In some examples, the processor 612 can be used to implement the example configuration tool 210, the example temperature comparator 204, the example current level adjustor 206, and the example current controller 208 (see FIG. 2).

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller. In some examples, the volatile memory 614 includes the first, second, third and fourth registers 214, 216, 218, 220 (see FIG. 2) and the example configuration memory 212 (see FIG. 2).

The processor platform 600 of the illustrated example can also include an interface circuit 620. The interface circuit 620 may be implemented by any type of interface standard, such as an Ethernet interface, a universal serial bus (USB), and/or a PCI express interface. In some examples, the interface circuit can be used to implement the example power bus 222 (see FIG. 2) to which the example current controller 208 (see FIG. 2) supplies the incoming charging current.

In the illustrated example, one or more input devices 622 are connected to the interface circuit 620. The input devices 622 can be used, for example, to enter charging profile information/parameters into the example configuration memory 212 (see FIG. 2) and to implement the example temperature sensor 202 (see FIG. 2), and the example second port 118 (see FIG. 2).

One or more output devices 624 can also be connected to the interface circuit 620 of the illustrated example. The output devices 624 can be implemented, for example, by display devices (e.g., a light emitting diode (LED), an organic light emitting diode (OLED), a liquid crystal display, emitting diode (LED). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, a low power wireless area network, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives. In some examples, the mass storage device 628 can be used to implement the example first, second, third, and/or fourth registers 214, 216, 218, 220 (see FIG. 2) and the example configuration memory 212 (see FIG. 2).

The coded instructions 632 of FIG. 5 may be stored in the mass storage device 628, in the volatile memory 614, in the non-volatile memory 616, and/or on a removable tangible computer readable storage medium such as a CD or DVD.

From the foregoing, it will appreciated that the above disclosed example methods, apparatus, systems, and articles of manufacture permit the control of battery charging current based on a charging profile, skin temperature readings, and system load changes. The methods, apparatus, systems, and articles of manufacture disclosed herein provide a variety of advantages. For example, the methods, apparatus and articles of manufacture disclosed herein provide improved battery charging current control to a battery powered electronic device. Such improved battery charging current control results in improved thermal stability greater overall charging speeds. Further, the methods, apparatus, systems, and articles of manufacture disclosed herein reduce the need for battery and electronic device manufacturers to perform extensive and costly testing to determine thermal relationship tables for each possible charging profile of a battery and the resulting impact on such a profile on the electronic device being charged.

A plurality of example methods, apparatus, and articles of manufacture are disclosed herein. Example no. 1 is a charging device that includes a temperature sensor to sense a skin temperature of an electronic device, the charging device being installed in the electronic device, a current controller to control a magnitude of the charging current to be supplied to a battery installed in the electronic device. The current controller causes the magnitude of the charging current to oscillate between an upper level and a lower level. The charging device also includes a current adjuster that adjusts the upper level downwards and the lower level upwards based on the skin temperature sensed by the temperature sensor.

Example no. 2 is the charging device of example no. 1 further including a memory device to store a store a thermal set point, and a comparator to compare the skin temperature to the thermal set point stored in the memory device, the comparator to transmit a signal to the current adjuster based on a plurality of comparisons made by the comparator.

Example no. 3 is the charging device of example no. 1, wherein the memory device also stores a step value representing an amount by which the current adjuster is to adjust the upper level and the lower level.

Example no. 4 is the charging device of example no. 1, wherein the current oscillates between the upper level and the lower level until the electronic device is unplugged from the charging device.

Example no. 5 is the charging device of example no. 2, wherein the current adjuster causes the current controller to decrease the upper level when the comparator determines that the skin temperature has moved from a first temperature above the thermal set point to a second temperature below the thermal set point. The current level adjustor also causes the current controller to increase the lower level when the skin temperature has changed from a third temperature above the thermal set point to a fourth temperature below the thermal set point.

Example no. 6 is the charging device of example no. 1, wherein the current adjustor adjusts at least one of the upper level and the lower level when a load on the electronic device changes.

Example no. 7 is the charging device of example no. 1, wherein the electronic device includes a cellular modem.

Example no. 8 is the charging device of example no. 1 wherein the electronic device includes a touchscreen display.

Example no. 9 is the charging device of example no. 1, wherein the electronic device is a portable telephone.

Example no. 10 is the charging device of any of example nos. 1, 2, 3, or 4, wherein the current adjustor adjusts at least one of the upper level and the lower level when a load on the electronic device changes.

Example no. 11 is the charging device of any of example nos. 1, 2, 3, or 4, wherein the electronic device includes a cellular modem.

Example no. 12 is the charging device of any of example nos. 1, 2, 3, or 4, wherein the electronic device includes a touchscreen display.

Example no. 13 is the charging device of any of example nos. 1, 2, 3, or 4, wherein the electronic device is a portable telephone.

Example no. 14 is a method to charge a battery installed in an electronic device, and includes sensing a skin temperature of the electronic device, causing a magnitude of a charging current to oscillate between a between an upper level and a lower level, and adjusting the upper level and the lower level based on the skin temperature sensed by the temperature sensor.

Example no. 15 is the method of example no. 14, wherein adjusting the upper level and the lower level includes storing a thermal set point, and comparing the skin temperature to the thermal set point stored in the memory device. The method of example no. 14 further includes transmitting a control signal to the current adjuster based on the comparing of the skin temperature to the thermal set point.

Example no. 16 is the method of example no. 15, further including storing a step value representing an amount by which to adjust the upper level and the lower level.

Example 17 is the method of example no. 14, wherein the charging current oscillates between the upper level and the lower level until the electronic device is unplugged from the charging device.

Example no. 18 is the method of example no. 15, wherein the current adjuster causes the current controller to decrease the upper level when the comparator determines that the skin temperature has moved from a first temperature above the thermal set point to a second temperature below the thermal set point, and the current level adjustor causes the current controller to increase the lower level when the skin temperature has changed from a third temperature above the thermal set point to a fourth temperature below the thermal set point.

Example no. 19 is the method of example no. 14, wherein the electronic device is capable of operating solely on battery power.

Example no. 20 is the method of example no. 14, wherein the electronic device includes a cellular modem.

Example no. 21 is the method of example no. 14, wherein the electronic device includes a touchscreen display.

Example no. 22 is the method of any of example nos. 14, 15, 17, or 18, wherein the electronic device is capable of operating solely on battery power.

Example no. 23 is the method of any of example nos. 14, 15, 17, or 18, wherein the electronic device includes a cellular modem.

Example no. 24 is the method of any of example nos. 14, 15, 17, or 18, wherein the electronic device includes a touchscreen display.

Example no. 25 is a tangible machine readable storage medium storing instructions that, when executed, cause a machine to at least sense a skin temperature of an electronic device, cause a magnitude of a charging current supplied to a battery of an electronic device to oscillate between an upper level and a lower level, adjust the upper level downwards and the lower level upwards based on the skin temperature sensed by the temperature sensor.

Example no. 26 is the tangible machine readable storage medium of example no. 25 wherein the instructions to adjust the upper level and the lower level include instructions to store a thermal set point, and compare the skin temperature to the thermal set point stored in the memory device. In example no. 26, the upper level and the lower level are adjusted based on how the skin temperature compares to the thermal set point.

Example no. 27 is the tangible machine readable storage medium of example no. 25, further including instructions to store a step value representing an amount of current by which to adjust the upper level and the lower level, and adjust the upper level and the lower level by the step value.

Example no. 28 is the tangible machine readable medium of example no. 25, wherein the charging current oscillates between the upper level and the lower level until the electronic device is unplugged from the charging device.

Example no. 29 is the tangible machine readable medium of example no. 26, wherein the upper level is decreased when the comparator determines that the skin temperature has moved from a first temperature above the thermal set point to a second temperature below the thermal set point and the lower level is increased when the skin temperature has changed from a third temperature above the thermal set point to a fourth temperature below the thermal set point.

Example no. 30 is the tangible machine readable medium of example no. 25, wherein the upper level and the lower level are disposed above and below a charging current value, respectively, and the charging current value corresponds to an amount of workload experienced by the electronic device.

Example no. 31 is the tangible machine readable medium of example no. 25, wherein the magnitude of the charging current value changes when the amount of workload experienced by the electronic device changes.

Example no. 32 is the tangible machine readable medium of any of example nos. 25, 26, 27 or 28, wherein the electronic device includes a cellular modem.

Example no. 33 is the tangible machine readable medium of any of example nos. 25, 26, 27 or 28, wherein the upper level and the lower level are disposed above and below a charging current value, respectively, and the charging current value corresponds to an amount of workload experienced by the electronic device.

Example no. 34 is the tangible machine readable medium of any of example nos. 25, 26, 27 or 28, wherein the magnitude of the charging current value changes when the amount of workload experienced by the electronic device changes.

Example no. 35 is the tangible machine readable medium of any of example nos. 25, 26, 27 or 28, wherein the electronic device includes a cellular modem.

Example no. 36 is a charging device having a means to sense a skin temperature of an electronic device. The charging device of example no. 36 is installed in the electronic device. The charging device further includes a means to control a magnitude of a charging current supplied to a battery installed in the electronic device. The means to control the magnitude of the charging current causes the magnitude of the charging current to oscillate between an upper level and a lower level. Example no. 36 also includes a means to adjust the upper level downwards and the lower level upwards based on the skin temperature sensed by the temperature sensor.

Example no. 37 is the charging device of example no. 36, further including memory means to store a store a thermal set point, and a means to compare the skin temperature to the thermal set point stored in the memory means. The means to compare transmits a signal to the means to adjust based on a plurality of comparisons.

Example no. 38 is the charging device of example no. 36, wherein the memory means is further to store a step value representing an amount by which the means to adjust is to adjust the upper level and the lower level.

Example no. 39 is the charging device of example no. 36, wherein the current oscillates between the upper level and the lower level until the electronic device is unplugged from the charging device.

Example no. 40 is the charging device of example no. 37, wherein the means to adjust causes the means to control the magnitude of the charging current to decrease the upper level when the comparator determines that the skin temperature has moved from a first temperature above the thermal set point to a second temperature below the thermal set point. The means to adjust also causes the means to control the magnitude of the charging current to increase the lower level when the skin temperature has changed from a third temperature above the thermal set point to a fourth temperature below the thermal set point.

Example no. 41 is the charging device of example no. 36, wherein the means to adjust adjusts at least one of the upper level and the lower level when a load on the electronic device changes.

Example no. 42 is the charging device of any of example nos. 36, 37, 38 or 39, wherein the electronic device includes a cellular modem.

Example no. 43 is the charging device of any of example nos. 36, 37, 38 or 39, wherein the electronic device includes a touchscreen display.

Example no. 44 is the charging device of any of example nos. 36, 37, 38 or 39, wherein the electronic device is a portable telephone.

Example no. 45 is a machine readable medium including code, when executed, to cause a machine to perform the method of any of example nos. 1, 2, 3 or 4.

Example no. 46 is an apparatus having means to perform a method of any of the preceding examples.

Example no. 47 is a machine-readable storage including machine-readable instructions, when executed, to implement a method or realize an apparatus of any of the preceding examples.

Although certain example methods, apparatus and articles of manufacture have been disclosed herein, the scope of coverage of this patent is not leveled thereto. On the contrary, this patent covers all methods, apparatus and articles of manufacture fairly falling within the scope of the claims of this patent.

What is claimed is:

1. A charging device comprising:
   a temperature sensor to sense a skin temperature of an electronic device, the charging device to be installed in the electronic device;
   a current controller to control a magnitude of a charging current to be supplied to a battery installed in the electronic device, the current controller to cause the magnitude of the charging current to oscillate between an upper level and a lower level; and
   a current adjuster to adjust, by a step value, at least one of the upper level downwards and the lower level upwards based on the skin temperature sensed by the temperature sensor, the adjustments to the upper level and the lower level to cause the magnitude of the charging current to oscillate in increasingly smaller oscillations until at least one of a) the upper level and the lower level become a same level, b) the upper level and the lower level are separated by less than the step value, and c) a load on the electronic device changes.

2. The charging device of claim 1, further including:
   a memory device to store a thermal set point; and
   a comparator to compare the skin temperature to the thermal set point stored in the memory device, the comparator to transmit a signal to the current adjuster based on a plurality of comparisons made by the comparator.

3. The charging device as defined in of claim 2, wherein the current adjuster decreases the upper level when the comparator determines that the skin temperature has moved from a first temperature above the thermal set point to a second temperature below the thermal set point temperature and the current level adjustor increases the lower level when the skin temperature has changed from a third temperature below the thermal set point to a fourth temperature above the thermal set point.

4. The charging device as defined in of claim 1, wherein the current adjustor is further to adjust at least one of the upper level upward and the lower level downward when the load on the electronic device changes.

5. The charging device of claim 1, wherein the electronic device includes a cellular modem.

6. The charging device of claim 1, wherein the electronic device includes a touchscreen display.

7. The charging device of claim 1, wherein the electronic device is a portable telephone.

8. The charging device of claim 1, wherein, when the upper level and the lower level become a same level, or when the upper level and the lower level are separated by less than the step value, the current adjuster is further to maintain the upper level and the lower level at a first value and a second value, respectively, the first value and the second value within a threshold amount of a target charging current, the target charging current equal to the same level, and the threshold amount equal to the step value.

9. The charging device of claim 8, wherein the target charging current corresponds to the load on the electronic device, and when the load on the electronic device changes, the current adjustor is to:
   1) adjust the upper level upward until the skin temperature rises above a thermal set point in response to the magnitude of the charging current changing from the lower level to the upper level; or
   2) adjust the lower level downward until the skin temperature falls below the thermal set point in response to the magnitude of the charging current changing from the upper level to the lower level.

10. A method to charge a battery installed in an electronic device, the method comprising:
    sensing a skin temperature of the electronic device;
    causing, by executing an instruction with a processor, a magnitude of a charging current to oscillate between an upper level and a lower level; and
    adjusting, by executing an instruction with the processor, at least one of the upper level and the lower level based on the skin temperature sensed by the temperature sensor, the adjusting of the upper level and the lower level to cause the magnitude of the charging current to oscillate in increasingly smaller oscillations until at least one of a) the upper level and the lower level become a same level, b) the upper level and the lower level are separated by less than a threshold amount, and c) a load on the electronic device changes.

11. The method of claim 10, wherein the adjusting of the upper level and the lower level includes:
    storing a thermal set point in a memory device;
    comparing the skin temperature to the thermal set point stored in the memory device; and transmitting a control signal to the current adjuster based on the comparing of the skin temperature to the thermal set point.

12. The method of claim 10, further including:

decreasing the upper level when the comparator determines that the skin temperature has moved from a first temperature above the thermal set point to a second temperature below the thermal set point; and increasing the lower level when the skin temperature has changed from a third temperature below the thermal set point to a fourth temperature above the thermal set point.

13. The method of claim 10, wherein the electronic device is capable of operating solely on battery power.

14. The method of claim 10, wherein the electronic device includes a cellular modem.

15. The method of claim 10, wherein the electronic device includes a touchscreen display.

16. The method of claim 10, further including when any of 1) the upper level and the lower level become the same level, or 2) the upper level and the lower level are separated by less than the step value, maintaining the upper level and the lower level at a first value and a second value, respectively, the first value and the second value within a threshold amount of a target charging current, the target charging current equal to the same level, and the threshold amount equal to the step value.

17. The method of claim 16, wherein the target charging current corresponds to the load on the electronic device, the method further including, when the load on the electronic device changes:

1) adjust the upper level upward until the skin temperature rises above a thermal set point in response to the magnitude of the charging current changing from the lower level to the upper level; or 2) adjust the lower level downward until the skin temperature falls below the thermal set point in response to the magnitude of the charging current changing from the upper level to the lower level.

18. A tangible machine readable medium comprising instructions which, when executed, cause a machine to at least:

sense a skin temperature of an electronic device;

cause a magnitude of a charging current supplied to a battery of an electronic device to oscillate between an upper level and a lower level;

when a plurality of skin temperature readings sensed by the temperature sensor indicate oscillations of the charging current are causing the skin temperature to oscillate around a thermal setpoint, adjust at least one of the upper level downwards and the lower level upwards, to cause the magnitude of the charging current to oscillate in increasingly smaller oscillations until at least one of a) the upper level and the lower level become a same level, and b) the upper level and the lower level are separated by less than a threshold amount; and when the plurality of skin temperature readings sensed by the temperature sensor indicate oscillations of the charging current are not causing the skin temperature to oscillate around the thermal setpoint, adjust at least one of the upper level upward and the lower level downward.

19. The tangible machine readable medium of claim 18, wherein the instructions to adjust the upper level and the lower level include instructions to:

store the thermal set point in a memory device; and compare the skin temperature to the thermal set point stored in the memory device, the upper level and the lower level adjusted based on how the skin temperature compares to the thermal set point.

20. The tangible machine readable medium of claim 19, further including instructions to:

store a step value representing an amount of current by which to adjust the upper level and the lower level; and adjust the upper level and the lower level by the step value.

21. The tangible machine readable medium & of claim 19, wherein the upper level is decreased when the skin temperature has moved from a first temperature above the thermal set point to a second temperature below the thermal set point, and the lower level is increased when the skin temperature has changed from a third temperature below the thermal set point to a fourth temperature above the thermal set point.

22. The tangible machine readable medium of claim 18, wherein the upper level and the lower level are above and below a target charging current value, respectively, the target charging current value corresponding to the load experienced by the electronic device.

23. The tangible machine readable medium of claim 18, wherein the electronic device includes a cellular modem.

24. The tangible machine readable medium of claim 18, wherein, when the upper level and the lower level become the same level, or when the upper level and the lower level are separated by less than the step value, the instructions are further to cause the machine to maintain the upper level and the lower level at a first value and a second value, respectively, the first value and the second value within the threshold amount of a target charging current, the target charging current equal to the same level.

* * * * *

UNITED STATES PATENT AND TRADEMARK OFFICE
CERTIFICATE OF CORRECTION

PATENT NO. : 10,305,292 B2
APPLICATION NO. : 15/283078
DATED : May 28, 2019
INVENTOR(S) : Madhavi et al.

It is certified that error appears in the above-identified patent and that said Letters Patent is hereby corrected as shown below:

In the Claims

Column 18, Line 6 (Claim 3): replace "as defined in of claim 2" with --of claim 2--

Column 18, Line 16 (Claim 4): replace "as defined in of claim 1" with --of claim 1--

Column 20, Line 27 (Claim 21): replace "medium & of claim 19" with --medium of claim 19--

Signed and Sealed this
Sixth Day of October, 2020

Andrei Iancu
*Director of the United States Patent and Trademark Office*